US007458578B2

(12) United States Patent
Stemmle

(10) Patent No.: US 7,458,578 B2
(45) Date of Patent: Dec. 2, 2008

(54) MAILPIECE FABRICATION SYSTEM

(75) Inventor: Denis J. Stemmle, Stratford, CT (US)

(73) Assignee: Pitney Bowes Inc., Stamford, CT (US)

(*) Notice: Subject to any disclaimer, the term of this patent is extended or adjusted under 35 U.S.C. 154(b) by 685 days.

(21) Appl. No.: 11/231,666

(22) Filed: Sep. 21, 2005

(65) Prior Publication Data

US 2007/0085333 A1 Apr. 19, 2007

(51) Int. Cl.

| | |
|---|---|
| ***B65H 29/00*** | (2006.01) |
| ***B65H 5/00*** | (2006.01) |
| ***B65H 9/00*** | (2006.01) |
| ***B65H 39/10*** | (2006.01) |
| ***G06F 7/00*** | (2006.01) |
| ***B65B 63/04*** | (2006.01) |
| ***B65B 11/48*** | (2006.01) |
| ***G07B 17/00*** | (2006.01) |
| ***B41L 3/02*** | (2006.01) |
| ***B41L 3/08*** | (2006.01) |
| ***B42D 15/00*** | (2006.01) |

(52) U.S. Cl. ....................... 271/279; 271/225; 271/226; 271/299; 700/220; 700/223; 53/429; 53/447; 53/460; 101/71; 101/486; 283/116

(58) Field of Classification Search .................. 700/56, 700/57, 186, 190, 192, 193, 213, 218, 219, 700/220, 223, 228; 271/8.1, 184, 185, 225, 271/226, 248, 250, 251, 278, 279, 299; 53/396, 53/428, 429, 435, 443, 447, 460; 101/71, 101/91, 483, 485, 486; 283/116

See application file for complete search history.

(56) References Cited

U.S. PATENT DOCUMENTS 5,196,083 A * 3/1993 Baker et al. ................. 156/364
5,201,517 A 4/1993 Stemmle ..................... 271/291
5,215,298 A 6/1993 Stemmle et al. ............... 271/65
5,326,093 A * 7/1994 Sollitt ........................ 271/306
5,350,245 A * 9/1994 Gallagher ................... 400/582
5,664,771 A * 9/1997 Nagatani et al. ......... 271/10.03
6,162,316 A * 12/2000 Spitler et al. ................ 156/227

(Continued)

OTHER PUBLICATIONS

U.S. Appl. No. 10/320,105, D.J. Stemmle, filed Dec. 16, 2002.

*Primary Examiner*—Crystal J Barnes Bullock
(74) *Attorney, Agent, or Firm*—Brian A. Collins; Angelo N. Chaclas

(57) ABSTRACT

A mailpiece fabrication system including a source for providing sheet material having mailpiece data printed thereon. The mailpiece fabrication system further includes at least one spatial positioning device adapted to direct the sheet material along one of two fabrication paths. Each fabrication path includes a fabrication assembly for producing one of at least two mailpiece configurations. In one embodiment, the spatial positioning device includes an orbiting nip roller for changing the elevation of the sheet material while, furthermore, providing an accurate and controlled mechanism for stacking and aligning sheet material to produce a flats mailpiece. In another embodiment, the spatial positioning device includes a routing roller in combination with the orbit nip roller to change the orientation of the sheet material. The routing roller is employed to change the direction of the sheet material relative to the feed path. Deformation binding mechanisms may be employed to form and seal various bind lines of the finished mailpiece.

15 Claims, 10 Drawing Sheets

U.S. PATENT DOCUMENTS

| | | | | |
|---|---|---|---|---|
| 6,592,506 | B1 * | 7/2003 | Lyga | 493/424 |
| 6,615,105 | B2 * | 9/2003 | Masotta | 700/219 |
| 6,648,319 | B2 * | 11/2003 | Chapman | 270/45 |
| 6,880,823 | B2 * | 4/2005 | Itoh et al. | 271/220 |
| 7,021,184 | B2 * | 4/2006 | Sussmeier et al. | 83/155 |
| 7,427,059 | B2 * | 9/2008 | Lyga et al. | 270/58.06 |
| 2007/0018379 | A1 * | 1/2007 | Stemmle | 271/226 |

* cited by examiner

MAILPIECE FABRICATION SYSTEM

TECHNICAL FIELD

This invention relates to fabricating a mailpiece, and more particularly, to a new and useful system for rapid, repeatable and reliable mailpiece creation using standard office paper stock. The invention, furthermore, provides a mailpiece fabrication system capable of manufacturing a mailpiece having one of a variety of mailpiece configurations, e.g., flats, letter sized, multi-sheet, etc., from the standard office paper stock.

BACKGROUND OF THE INVENTION

In the context of mailpiece delivery, a self-mailer is a term used for identifying mailpieces which employ some portion of its content information or material to form a finished mailpiece, i.e., a mailpiece ready for delivery. In addition to certain efficiencies gained from the dual use of paper stock, i.e., as both envelope and content material, self-mailers mitigate the potential for disassociation of content material from the mailing envelope, i.e., preventing mail from being delivered to an incorrect address.

In the simplest form, a self-mailer may include a single sheet of paper having printed communications or text on one side thereof and a mailing address on the other. The sheet is then folded and stapled to conceal the printed communications while causing the mailing address to remain visible. Postage is then applied to the face of the mailpiece in preparation for delivery. This example simply shows that a self-mailer generally seeks to make dual use of the content material to both convey information while forming an envelope of a size and shape which is accepted by postal automation equipment. As such, the material and labor cost associated with combining content material with a container or envelope is minimized.

One such self-mailer includes flat mailpieces which are knurled along each edge of a four-sided rectangular mailpiece. These "flats", as they are frequently called, employ face sheets of paper stock which are oversized relative to the internal content material/sheets such that the peripheral edges thereof extend beyond the edges of the internal sheets on all four sides. The peripheral edges are then deformation bound along the entire length to capture and enclose the content material. Such deformation binding is a process wherein, following plastic deformation of the sheets, the elastic properties thereof develop mechanical forces at or along the interface, which forces are sufficient to bind the sheets together. Alternatively, or additionally, deformation binding may also be viewed as a process wherein the individual fibers of paper stock, upon the application of sufficient pressure/force, interleave or "hook" to form a mechanical interlock. As such, the content material and face sheets may be produced at a single workstation, stacked together and bound without the need for other handling processes i.e., such as folding of the content material or insertion of the content material into an envelope. Furthermore, and, perhaps more importantly, a self-mailer which employs deformation binding eliminates the requirement for consumable materials such as glue, staples or clips to form the enclosure or bind the edges.

Notwithstanding the potential benefits achievable by deformation binding, drawbacks relating to the inability to closely control the lay-up, stacking and or registration of the sheet material offer some explanation for its lack of widespread acceptance and use. More specifically, prior art systems offer no suitable solution relating to the controlled lay-up of the internal content sheets relative to the external face sheets. That is, without adequate control of the relative placement of the sheet material, the deformation binding operation can inadvertently bind the internal content material, i.e., to itself or to the external face sheets.

Furthermore, while self-mailers do not require the use of consumable materials, such mailers typically employ prefabricated paper stock or specialty forms. That is, such mailers oftentimes incorporate unique fold lines, windows or feed apertures to facilitate fabrication or printing. These mailer sheets/forms are typically pre-glued using pressure sensitive or dual element adhesives. As a result, their unique design does not facilitate or accommodate the use of conventional paper stock, i.e., common size and paper thickness/consistency. Consequently, while certain mailpiece fabrication costs are reduced, others, i.e., such as the prefabricated paper stock used in its fabrication, are greatly increased.

Finally, prior art mailpiece fabrication systems are typically dedicated to fabricating a single type of mailpiece. For example, the deformation binding apparatus discussed above is a machine dedicated to the fabrication of a flats type mailpiece. To achieve a different mailpiece configuration, another mailpiece fabrication system must be employed. Consequently, if several mailpiece configurations are desirable, dedicated mailpiece fabrication systems are required, one for each mailpiece type.

A need, therefore, exists for a mailpiece fabrication system which enables fabrication of different mailpiece types, minimizes mechanical complexities, minimizes the use of consumable materials, and facilitates fabrication using conventional paper stock.

SUMMARY OF THE INVENTION

A mailpiece fabrication system is provided including a source for providing sheet material having mailpiece data printed thereon. The mailpiece fabrication system further includes at least one spatial positioning device adapted to direct the sheet material along one of two fabrication paths. Each fabrication path includes a fabrication assembly for producing one of at least two mailpiece configurations. In one embodiment, the spatial positioning device includes an orbiting nip roller for changing the elevation of the sheet material while, furthermore, providing an accurate and controlled mechanism for stacking and aligning sheet material to produce a flats mailpiece. In another embodiment, the spatial positioning device includes a routing roller in combination with the orbit nip roller to change the orientation of the sheet material. The routing roller is employed to change the direction of the sheet material relative to the feed path. Deformation binding mechanisms may be employed to form and seal various bind lines of the finished mailpiece.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION

The present invention describes an apparatus for fabricating mailpieces which vary in configuration, e.g., size, shape, thickness, number of sheets, etc. The mailpiece fabrication system employs a novel arrangement for splitting fabrication paths depending upon the type of mailpiece to be produced, e.g., a flats mailpiece or letter size mailpiece. Along one fabrication path, a sheet material is fed, stacked and bound along orthogonal edges to produce a flats mailpiece. Along another fabrication path, a sheet material may be fed, rolled into a tubular shape and bound along a central seam to produce a conventional letter size mailpiece. Alternatively, a conventional letter sized envelope may be fabricated by an assembly of creasing and folding rollers to: (i) form an envelope using a first sheet of material and (ii) form folded content sheets using subsequent sheets of material of the same size. All sheets of material, whether to form a flats or conventional letter sized envelop, may be produced and delivered by a conventional variable data printer. Consequently, conventional or standard office size paper stock may be used to form both the envelope and content sheets. Alternatively, the sheets may be printed on a continuous paper web and cut to the required size.

Figure 1:
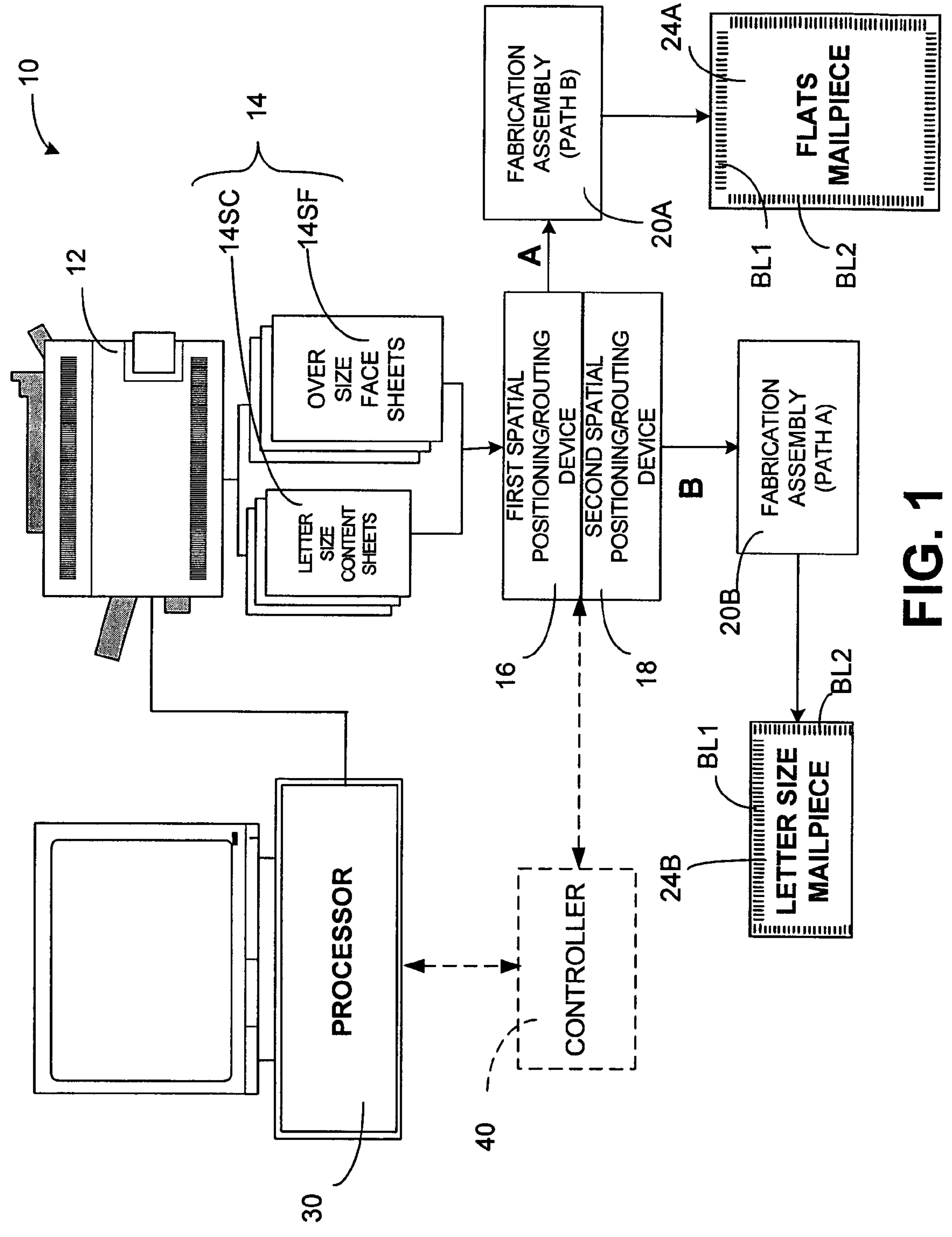
FIG. 1 is a block diagram of a mailpiece fabrication system according to the present invention.
Figure 2:
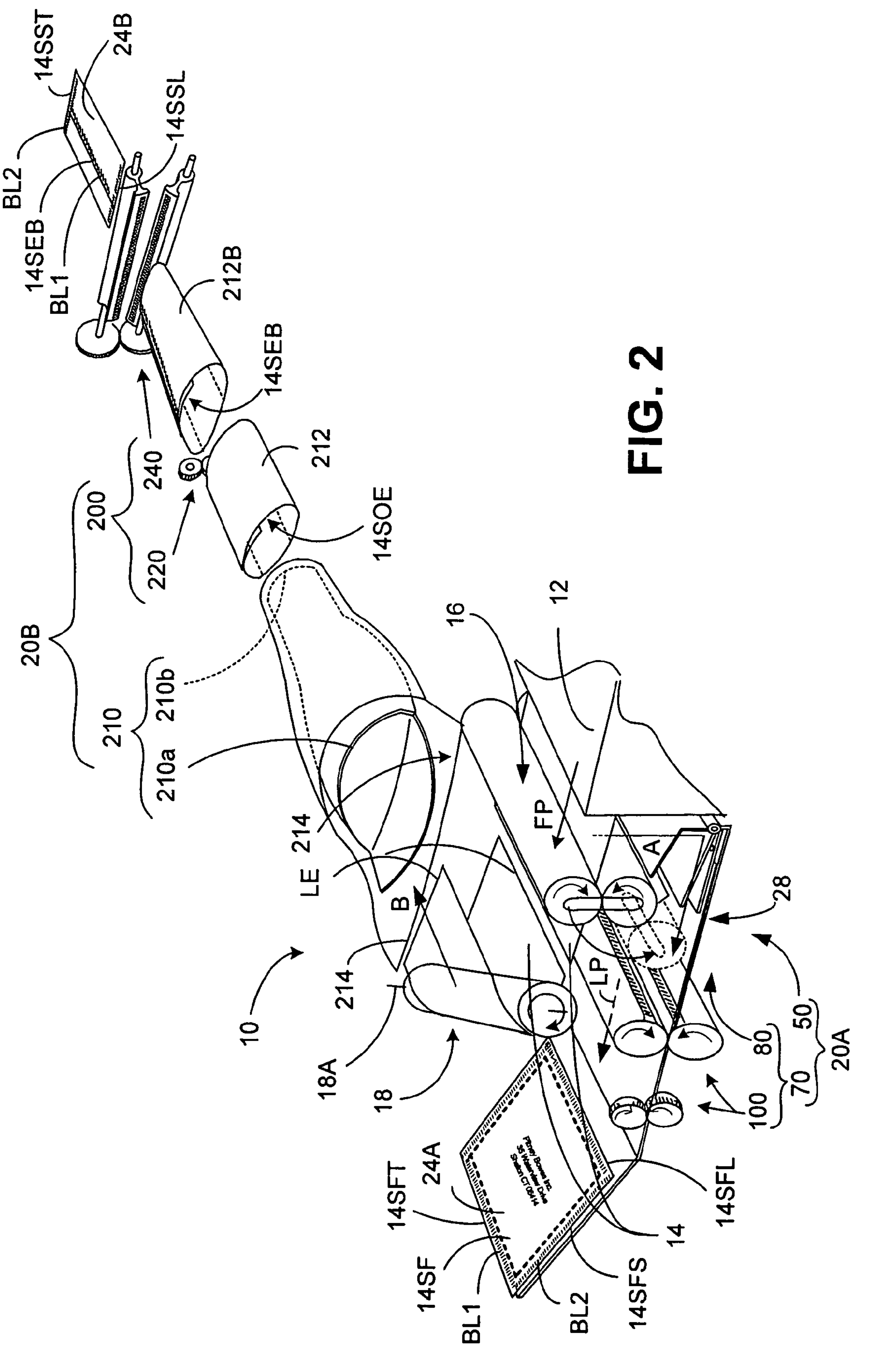
FIG. 2 is a perspective illustration of the mailpiece fabrication system including two fabrication paths each producing one of at least two mailpiece configurations.

In FIGS. 1 and 2 a block diagram and schematic perspective illustration, respectively, is shown of a mailpiece fabrication system 10 according to the present invention. In the broadest sense of the invention, the mailpiece fabrication system 10 comprises: (a) a source 12 for supplying/producing sheet material 14 having mailpiece data printed thereon, (b) at least one spatial positioning device 16 for changing the direction of the sheet material 12 and directing the sheet material 12 along one of two fabrication paths A, B, and (c) first and second fabrication assemblies 20A, 20B for fabricating finished mailpieces 24A, 24B. The fabrication assemblies 20A, 20B receive the sheet material 14 from the spatial positioning device 16 and produce a finished mailpiece 24A, 24B having one of at least two mailpiece configurations.

As shown, the mailpiece fabrication system 10 provides at least two fabrication paths A and B wherein a flats mailpiece 24A is produced along fabrication path A and a standard letter-size mailpiece 24B is produced along fabrication path B. In the described embodiment, a variable data printer 12 supplies the sheet material 14 used in the fabrication of each type mailpiece 24A, 24B and prints mailpiece data on individual sheets of material 14. Inasmuch as the printer 12 is connected to, and adapted to receive print commands from a computer 30, the mailpiece data may be created on the computer 30 and vary, i.e., from mailpiece to mailpiece, in accordance with the communication/correspondence. While a variable data printer 12 is described in the illustrated embodiment, the sheet material source 12 may be a conventional paper feed device having supply trays filled with preprinted or previously prepared sheet material 14 mailpiece. Alternatively, a roll of pre-printed sheets may be cut to size from a continuous paper web (not shown) before entering the spatial positioning device 16.

For example, for producing a flats mailpiece 24A, the printer 12 supplies a face sheet 14SF (FIG. 1 only) along a feed path FP (seen in FIG. 2) having a destination address and/or return address and content sheets 14SC containing other mailpiece specific data. Furthermore, the printer 12 may contain at least two sources of paper, each paper source containing a predetermined size of paper stock for each of the face and content sheets 14SF, 14SC. One source may contain conventional letter size sheet material, (e.g., 8½×11) for use as the content sheets 14SC while another source may contain oversized sheet material (e.g., 9½×12) for use as the face sheets 14SF. The relative size of the sheet material 14 will become apparent when discussing the fabrication of a flats mailpiece.

To accommodate delivery of sheet material 14 to each of the fabrication paths A, B, the spatial positioning device is adapted to vary the height/elevation of sheet material 14 exiting the printer 12. More specifically, the spatial positioning device 16 includes a first pair of rollers 16*a*, 16*b* which provide controlled lay-up of sheet material 14 onto a compiler tray 28 for producing a flats mailpiece 24A along fabrication path A. As such, the elevation of the sheet material 12 is varied, e.g., lowered in the described embodiment, relative to the height of the printer output tray (not shown). In the described embodiment, the spatial positioning device 16 includes another spatial positioning device 18 to re-direct the sheet material 14 for producing a letter size mailpiece 24B along fabrication path B. That is, the second spatial positioning device 18 serves to orient the sheet material to present the proper edge of a rectangular sheet of material 14. The import of such sheet material orientation will become apparent when discussing the fabrication of a letter size mailpiece 24B.

Figure 3:
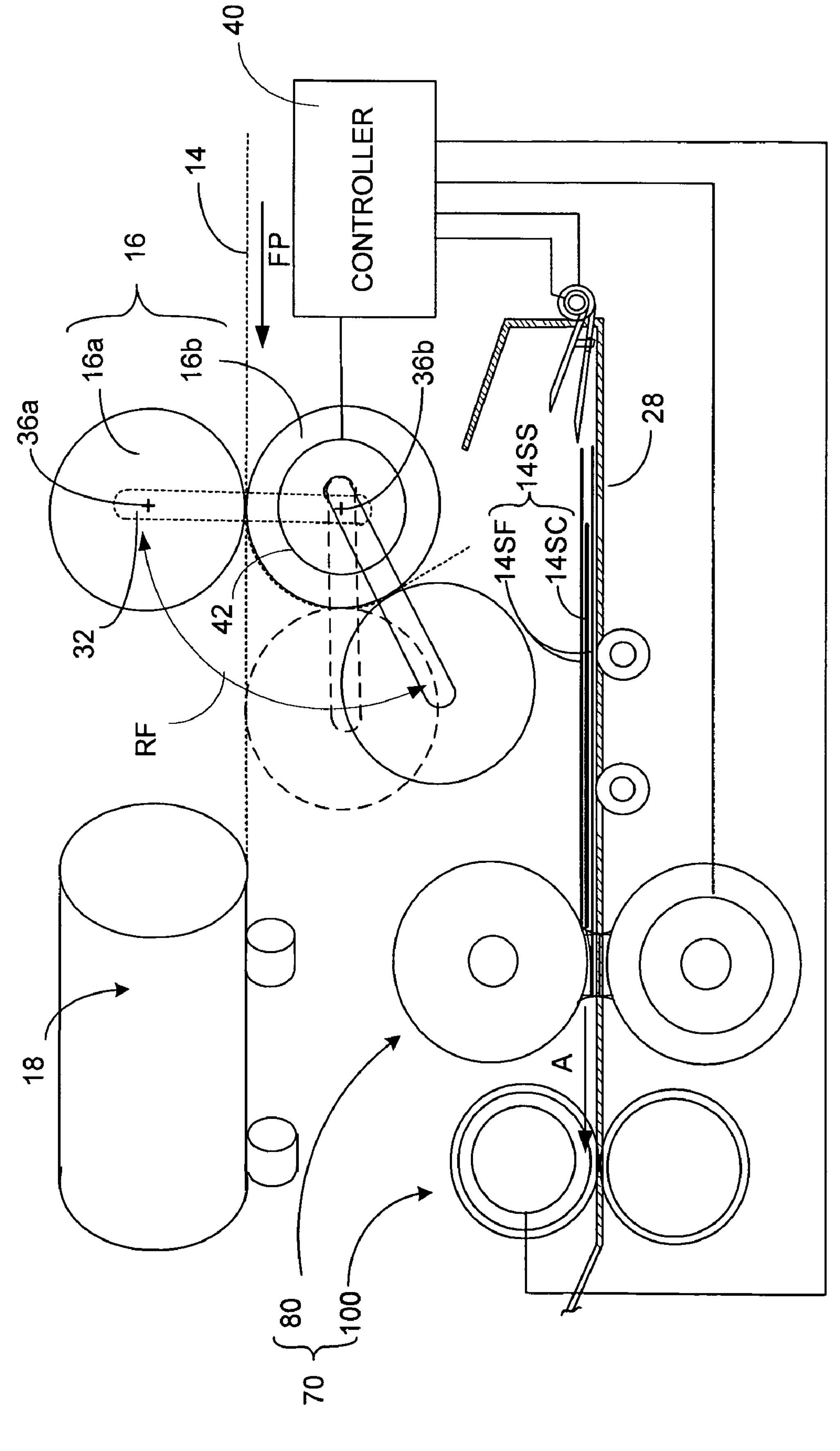
FIG. 3 is a schematic profile view of the mailpiece fabrication system along one of the fabrication paths illustrating the operation of a spatial positioning device for changing the elevation of sheet material used in the fabrication of a mailpiece.

With respect to creating a flats mailpiece along fabrication path A, reference is made to FIGS. 2 and 3. Therein, a plurality of individual sheets 14SF, 14SC are laid upon the compiler tray 28 to form a multi-sheet stack 14SS. Sheet material 14 exits the printer 12 and is captured between and retained by the first spatial positioning device 16. In the described embodiment, the first spatial positioning device 16 is an orbit nip roller comprising idler and drive rollers 16*a*, 16*b* coupled by a carriage assembly 32. The carriage assembly 32 is mounted, at each end thereof, to the rotational axes 36*a*, 36*b* of the rollers 16*a*, 16*b* such that by fixing the spatial position of one roller (the drive roller 16*b*), the other roller, (the idler roller 16*a*) may be caused to orbit about the rotational axis 36*b* of the drive roller 16*b*.

A controller 40 provides control inputs to a rotary actuator 42 which is mounted about the axis 36*b* of the drive roller 16*b*. A roller drive actuator (not shown) is operable to rotate the drive roller 16*b* in a counterclockwise direction to drive both the idler and drive rollers 16*a*, 16*b* about there respective axes 36*a*, 36*b*. A carriage drive actuator 42 is operable to drive the carriage assembly 32 and idler roller 16*a* about the rotational axis 36*b* of the drive roller 16*b*. More specifically, the carriage drive actuator 42 bi-directionally rotates the carriage assembly 32, and, consequently the idler roller 16*a*, through an angle defined by an arc RF. The significance of rotating the carriage assembly 32 will become apparent in view of the subsequent discussion.

Figure 4A:
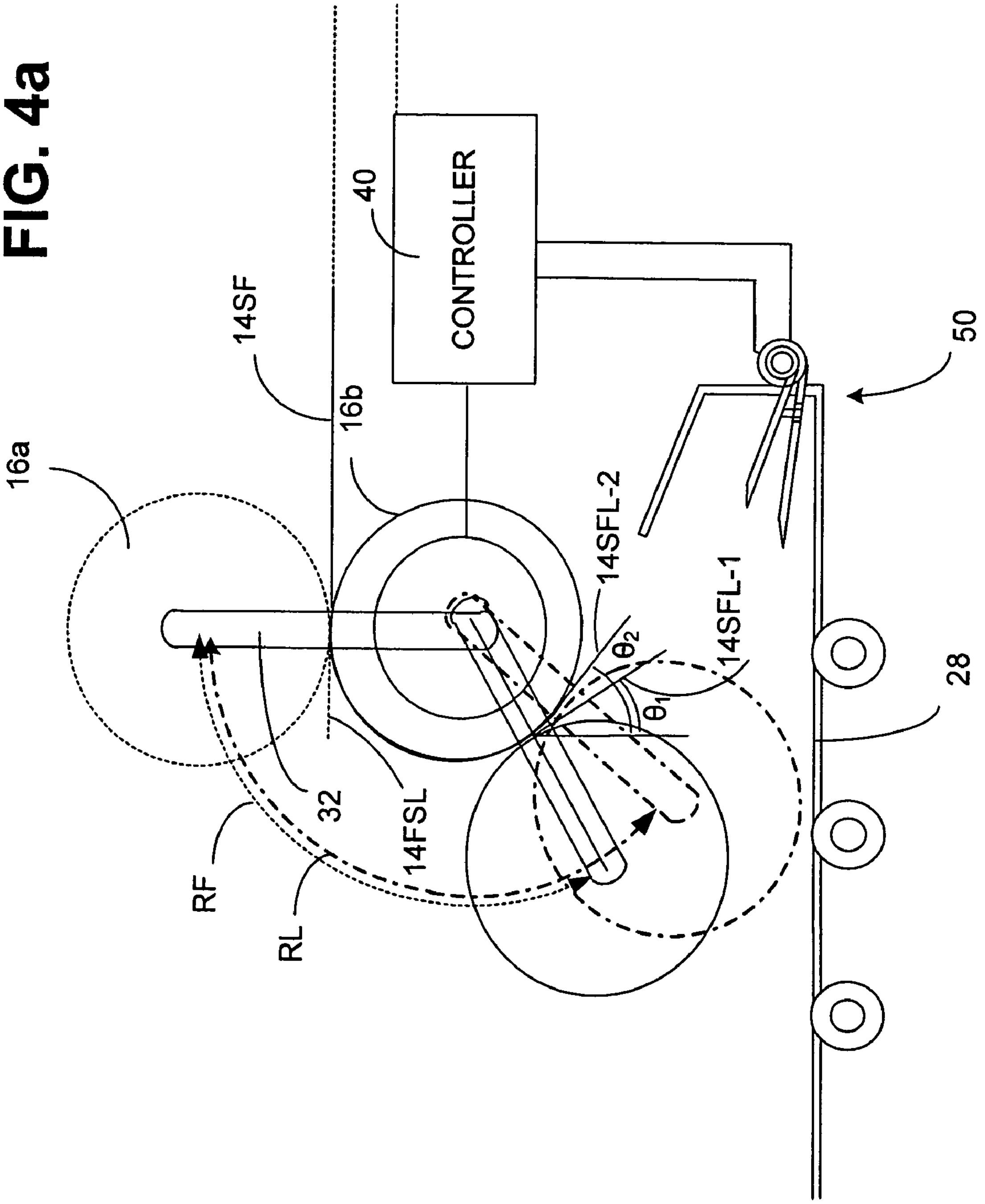
FIGS. 4*a* and 4*b* are profile views of the first spatial positioning device and its sequence of operation in connection with laying individual sheets of material to form a flats mailpiece.
Figure 4B:
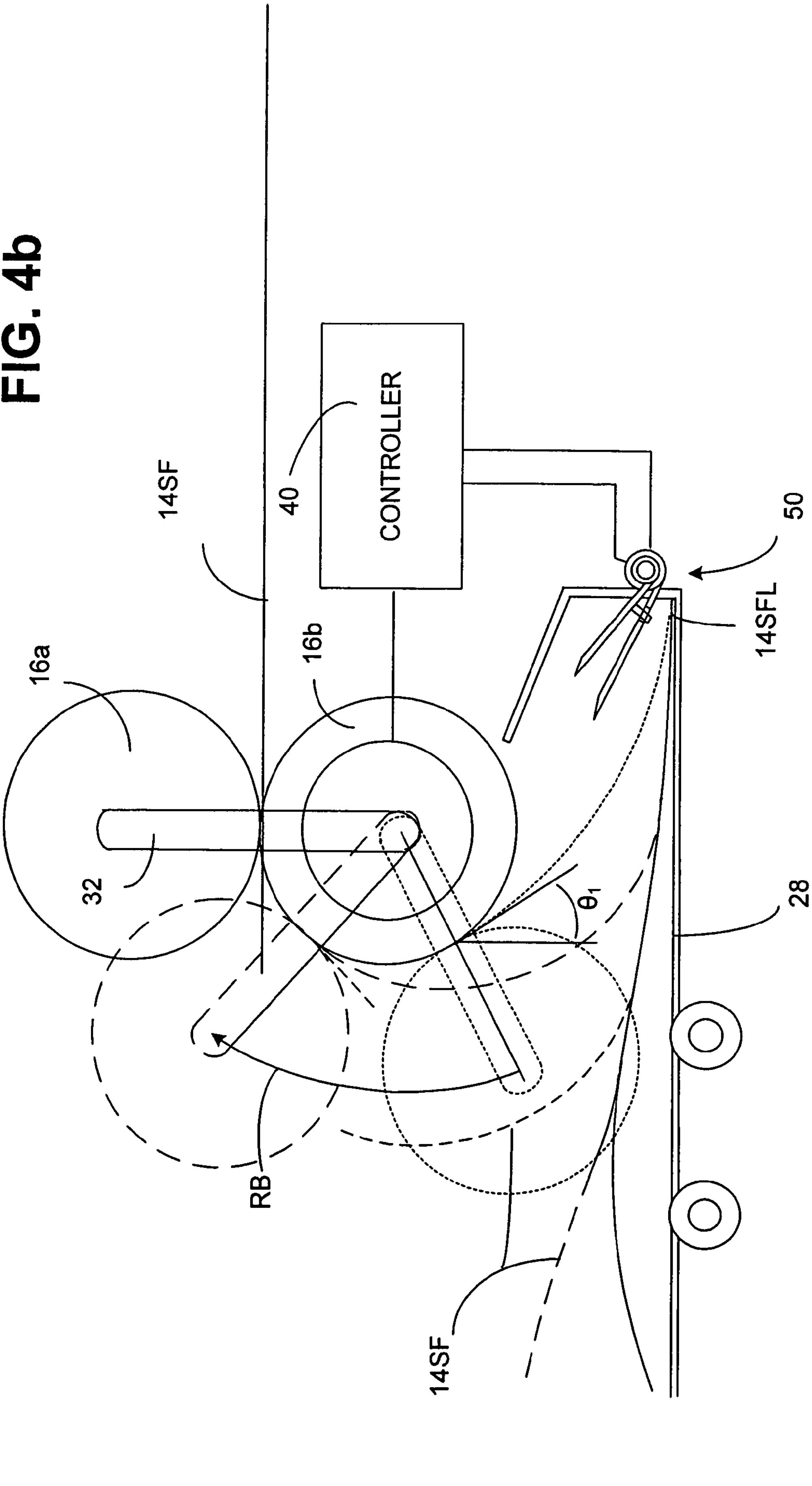

In FIGS. 4*a* and 4*b*, various operational positions of the orbit nip roller 16 are shown to illustrate the lay-up and alignment of the multi-sheet stack 14SS. As will be apparent upon examination of the figures, the orbit nip roller 16 (i) accepts a leading edge portion of a sheet, (ii) rotates in one direction to change the elevation and attitude of the leading edge portion, and, (iii) pauses momentarily to pay out sheet material to a registration device (discussed in greater detail subsequently) and (iv) rotates in the opposite direction while, at the same time, continuing to pay-out the remaining portion of the sheet. To facilitate the description, the sequence of operation and rotational position/motion of the orbit nip roller 16 will only be described in the context of laying a first face sheet 14SFL of the multi-sheet stack 14SS. It will be appreciated that the orbit nip roller 16 repeats this sequence for as many sheets 14 as there are in the multi-sheet stack 14SS.

In FIG. 4*a*, the rollers 16*a*, 16*b* rotate to capture a leading edge portion 14$SF_L$ of the first face sheet 14SF between the rollers 16*a*, 16*b*. In this position, the idler roller 16*a* is shown in dashed lines. When the leading edge portion 14SFL protrudes slightly past the rollers 16*a*, 16*b*, idler roller 16*a* orbits, by rotation of the carriage assembly 32, in a counterclockwise direction about the rotational axis of the drive roller 16*b*. The rotational motion of the carriage assembly 32 is substantially equal to the rotational speed of the drive roller 16*b* such that the rotational motion of the idler roller 16*a* is momentarily paused while orbiting. That is, by equilibrating the rotational speed of the carriage assembly and drive roller 16*b*, the relative motion of the rollers 16*a*, 16*b* at the nip or contact point therebetween is momentarily nulled. As such, the relative position of the leading edge portion 14SFL to the nip between the rollers 16*a*, 16*b* remains constant, though the sheet 14 begins to wrap around the drive roller 16*b*.

The idler roller 16*a* orbits about the drive roller through an angle defined by arc RF. In the described embodiment, the angle defined by the arc RF is greater than about ninety degrees (90°) and less than about one-hundred eighty degrees (180°). As the idler roller 16*a* orbits about the drive roller 16*b*, the attitude of the leading edge portion 14SFL of the sheet 14SF changes from horizontal to downward and rearward thereby directing the leading edge portion 14SFL toward the compiler tray 28, i.e., a registration surface of the compiler tray 28.

Figure 5A:
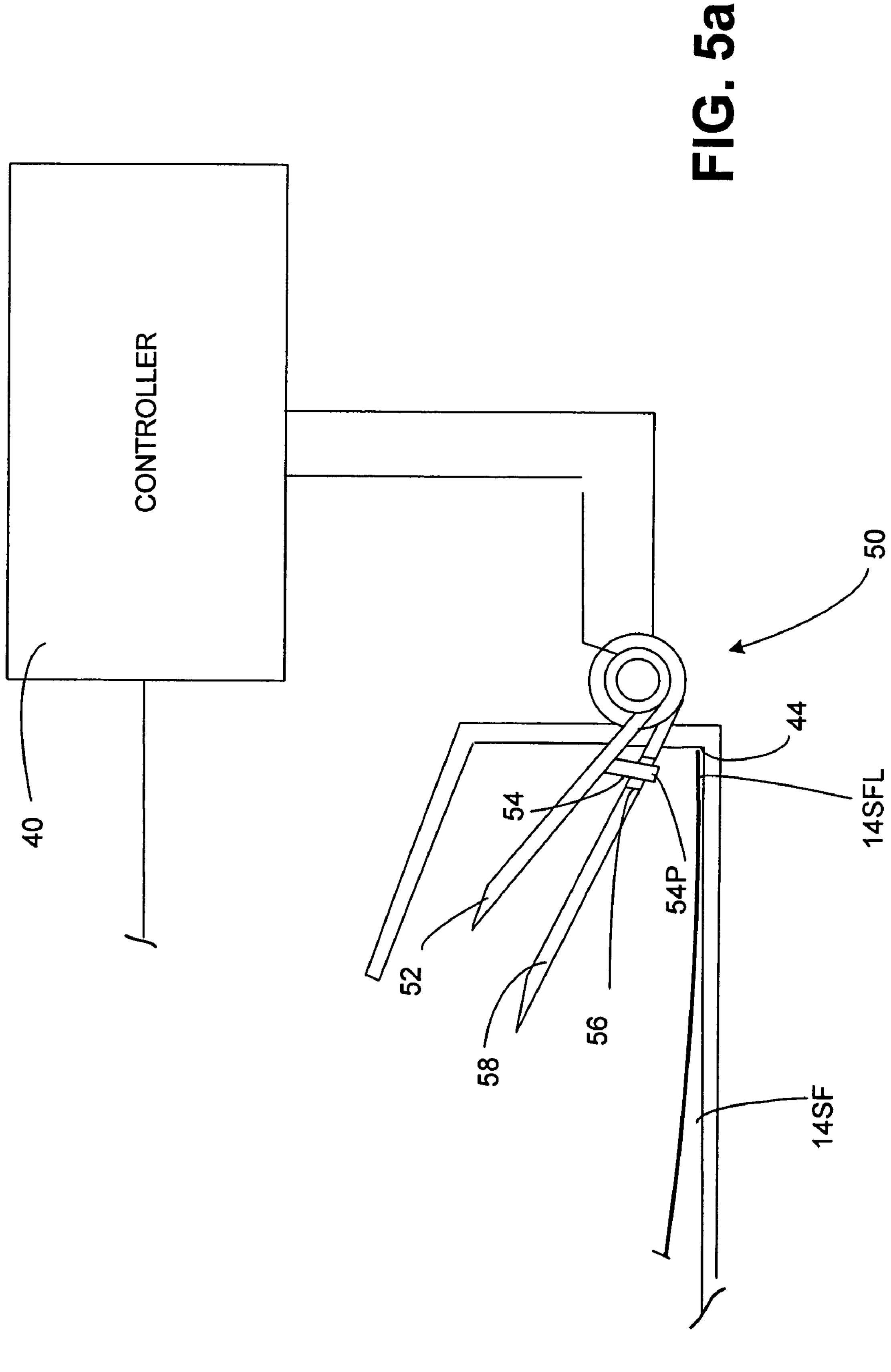
FIGS. 5*a*-5*c* are profile views of a registration device useful for aligning the leading edges of sheet material to form a multi-sheet stack.

Upon reaching a first angular position $\theta_1$, the orbit nip rollers 16*a*, 16*b* pay-out the sheet 14SF over a short dwell period. In FIGS. 4*b* and 5*a*, the dwell period is timed such that the leading edge 14SFL is caused to abut a first face sheet registration surface 44 (see FIG. 5*a*) of a registration device 50 disposed below the rollers 16*a*, 16*b*. For the purposes of defining assembly components, the registration device 50 is a first component of the fabrication assembly 20A of fabrication path A. After the dwell period has elapsed (which may be only several fractions of a second), the rollers 16*a*, 16*b* continue to rotate to pay-out the remaining portion of the sheet 14SF and orbit in the opposite direction, i.e., clockwise direction, denoted by an arrow RB. The orbit nip rollers 16*a*, 16*b* return to their initial receipt position (shown in solid lines in FIG. 4*b*) and continue to rotate in order to fully pay-out the first face sheet 14SF. The rollers 16*a*, 16*b* are now in the proper position to accept the leading edge of subsequent sheets 14 of the multi-sheet stack 14SS.

Figure 5B:
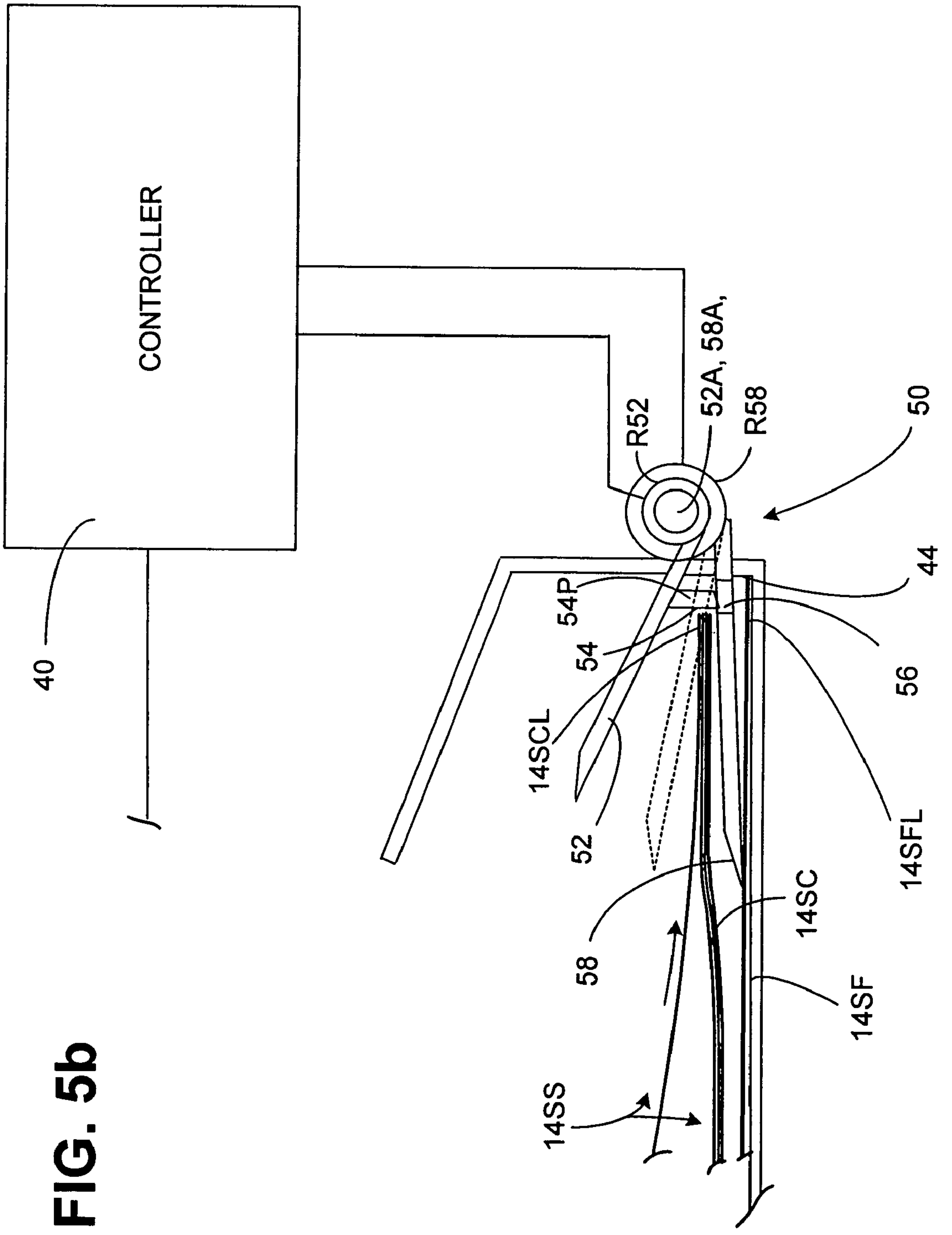
Figure 5C:
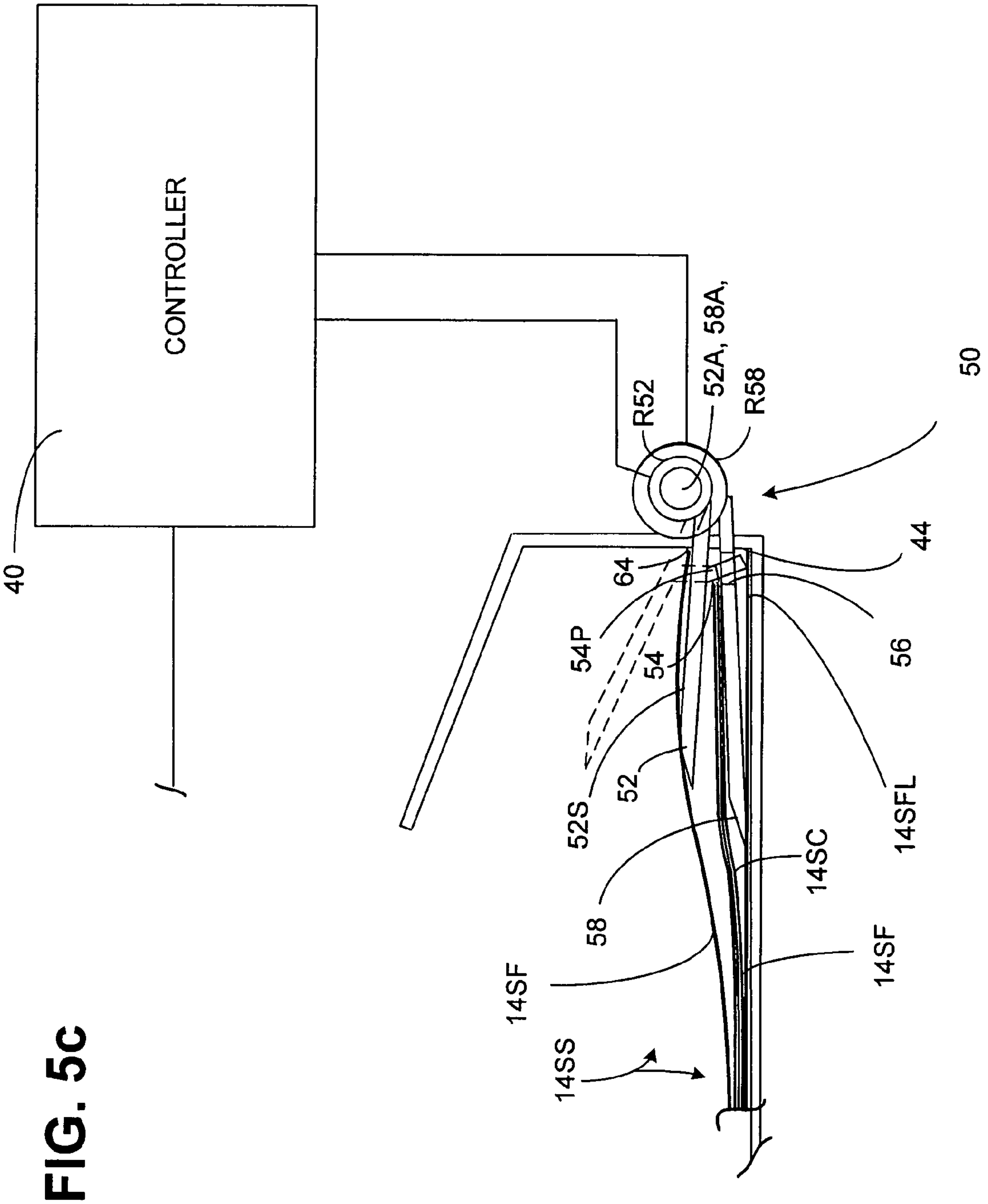

In FIGS. 5*a*-5*c*, the registration device 50 functions to align the edges of each face and content sheets 14SF, 14SC and provide a guide to capture the sheets 14SF, 14SC as each is paid-out by the orbit nip rollers 16*a*, 16*b*. A principle requirement for fabricating a flats mailpiece relates to the relative edge placement of the face and content sheets 14SF, 14SC. More specifically, the internal content sheets 14SC must be laid upon the first face sheet 14SF such that the leading edge 14SCL of each content sheet 14SC is disposed inboard of the leading edge 14SFL of the face sheet 14SF. To ensure proper registration of the content sheets 14SC, the registration device 50 includes at least one registration plate 52 pivotally mounted to an end portion of the compiler tray 28. More specifically, the registration plate 52 includes a content sheet registration surface 54 and may be pivoted from a registration position (shown in dashed lines) to a closed position (shown in solid lines). A rotary actuator R52 receives control inputs from the controller 40 and is operable to rotationally reposition the registration plate 52

The registration device 50 may also include a guide plate 58 interposing the registration plate 52 and compiler tray 28. In the described embodiment, the guide plate 58 is pivotally mounted to the compiler tray about an axis 58A which is co-axial with the rotational axis 52A of the registration plate 52. Similarly, a rotary actuator R58 receives control inputs from the controller 40 and is operable to rotationally position the guide plate 58 from an open position (shown in dashed lines in FIG. 5*b*) to a closed position (shown in solid lines in FIG. 5*c*).

The content sheet registration surface 54 of the registration plate 52 may be defined by a series of tabs 54P extending downwardly from the plate 52, several aligned pins or other structure which is substantially orthogonal to a plane defined by the multi-sheet stack 14SS. In the described embodiment, several aligned tabs 54P protrude from the registration plate 52 and seat within an aperture or slot 56 formed within the guide plate 58. The slots accept each tab 54P to facilitate alignment and ensure that the content sheets 14SC are constrained by the registration surface 54. The interaction of the tabs 54 and slots 56, will be more clearly understood when describing the operation of the registration and guide plates 52, 58.

In FIG. 5*c*, the registration plate 52 is shown in its registration position (illustrated by dashed lines) and its closed position (shown in solid lines). Once the content sheets 14SC have been laid upon the first face sheet 14SF-1, a final or second face sheet 14SF-2 is paid-out by the orbit nip rollers 16*a*, 16*b* (not shown in FIG. 5*c*). Prior to laying the second face sheet 14SF-2, the registration plate 52 is pivoted downwardly, from its registration to guide positions. In its guide position, the registration plate 52 is nearly parallel to the guide plate 58 and facilitates the receipt and alignment of the second face sheet 14SF-2. More specifically, by rotating the registration plate 52 downward, the second face sheet 14SF-2 may be laid upon the upper surface 52S of the registration plate 52. The leading edge of the second face sheet 14SF-2 is then caused to abut a second registration surface 64 of the registration device 50 which is vertically aligned with the first registration surface 44.

While in the guide position, the tabs 54 of the registration plate 52 are accepted within the slots of the guide plate 58. As such, an interlocking impasse is created with respect to the abutting edges of the content sheets 14SC to inhibit any further motion of the lead edges of the content sheets 14SC, i.e., by an edge sliding or passing underneath the tabs 54.

The second face sheet 14SF-2 is paid-out by the orbit nip roller 16 in the sequence previously described. It should be noted, however, that while the operation of the orbit nip roller 16 is essentially identical with respect to each sheet 14 of the multi-sheet stack 14SS, the idler roller 16*a* orbits through several angular positions depending upon the which sheet 14 of the multi-stack sheet is laid. In the described embodiment, the idler roller 16*a* orbits through at least three angular positions to lay the first face sheet, 14SF-1, the content sheets 14SC and the second face sheet 14SF-2. For illustration purposes, two angular positions $\theta_1$ and $\theta_2$ of the leading edge of each of the face sheets 14SF-1, 14SF-2 are shown in FIG. 4*a*. It will be appreciated that with each angular position of the idler roller 16*a*, the attitude for delivering each of the face sheets 14SF-1, 14SF-2 changes to ensure that the leading edge abuts the registrations surfaces 44, 64

Returning to FIGS. 1, 2 and 3*a*, once properly spatially positioned and aligned, the multi-sheet stack 14SS is passed to the remaining elements of the fabrication assembly 20A. In the illustrated embodiment, the fabrication assembly 20 also comprises an in-line deformation binding apparatus 70 for deformation binding the peripheral edge of the multi-sheet stack. More specifically, the in-line deformation binding apparatus 70 comprises axial and radial binding mechanisms 80, 100 which are juxtaposed such that the multi-sheet stack 14SS passes from one to the other of the binding mechanisms 80, 100 along a linear feed path or single line of travel. Moreover, the binding mechanisms 80, 100 perform at least two binding operations which produce orthogonal bind lines BL1, BL2.

As discussed in the Background of the Invention, deformation binding is a familiar process wherein sheet stock is plastically deformed such that mechanical forces are developed along the interface to bind the sheets together. Such mechanical forces are believed to cause the individual fibers of paper stock to interlock.

Figure 6:
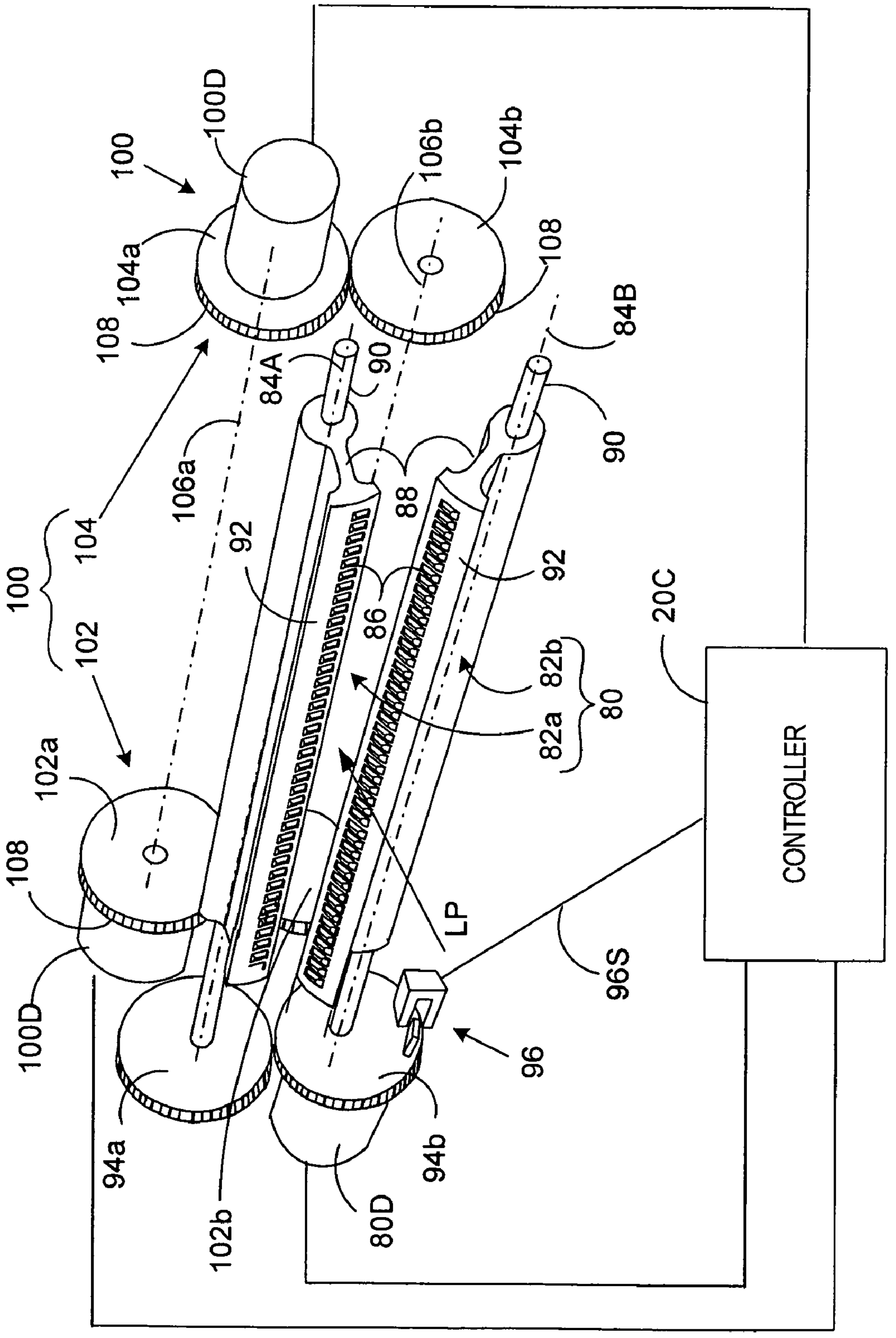
FIG. 6 is an isolated perspective view of an in-line deformation binding apparatus employed along one of the fabrication paths including an axial and radial deformation binding mechanism.

FIG. 6 shows an isolated perspective view of the relevant components of the axial and radial binding mechanisms 80, 100. The axial binding mechanism 80 includes a pair of rotating elements 82*a*, 82*b* defining rotational axes 84A and 84B, respectively, and an axial array of opposed intermeshing teeth 86. More specifically, each of the rotating elements 82*a*, 82*b* comprises an elongate radial support member 88 mounted upon and driven by a central shaft 90.

The axial array of teeth 86 are substantially parallel to the respective rotational axes 84A, 84B, and rotationally indexed such that the teeth 86 intermesh at a predefined angular position of the radial support members 88. In the context used herein, "substantially" parallel, means that the array of teeth 86 define a line which is within about ±5 degrees relative to the respective rotational axis 84A, 84B.

In the described embodiment, the rotating elements 82*a*, 82*b* rotate through one or more complete revolutions, though the teeth 86 are operable to deformation bind through a relatively small angle thereof. That is, to deformation bind an edge of the multi-sheet stack 14SS, the intermeshing teeth 86 may traverse a small arc, e.g., fifteen to twenty degrees (15-20 degrees). However, inasmuch as many applications will require deformation binding along at least two edges, e.g., leading and trailing edges, the rotating elements may rotate through two full revolutions. Generally, one full revolution will be required to deformation bind a leading edge of a mailpiece while a second revolution may be desirable to deformation bind a second or trailing edge of the same mailpiece. As such, two parallel bind lines BL1, BL2 are produced.

The teeth 86 are driven about their respective axes 84A, 84B, by a drive actuator 80D. In the described embodiment, the shafts 90 are rotationally coupled by a pair of spur gears 94*a*, 94*b* of equal root diameter. The drive actuator 80D may be co-axially aligned with and drive one of the spur gears 94*b*, which, in turn, drives the other spur gear 94*a* such that both elements 82*a*, 82*b* counter-rotate. Inasmuch as the spur gears 94*a*, 94*b* are equal in root diameter, the rotating elements 82*a*, 82*b* of the axial binding mechanism 80 rotate at the same rotational speed to index the teeth 86 into meshing engagement. To control the rotational speed, or position the teeth 86 relative to an edge of the multi-sheet stack 14SS, it may be desirable to include a position/home sensor 96 coupled to one of the spur gears 94*a*, 94*b*. An output signal 96S of the position/home sensor 96 may be received by a controller 20C for controlling the position of the drive actuator 80D. One such position is a home position wherein the teeth 86 are disposed at a start position in preparation for deformation binding the leading edge of the multi-sheet stack 14SS. Further, the controller 20C may index the teeth 86 to be synchronized with the leading or trailing edges of the multi-sheet stack 14SS as it passes between the rotating elements 82*a*. 82*b* of the axial binding mechanism 80.

The radial binding mechanism 100 includes two pairs of rotating discs 102, 104. Rotating discs 102*a*, 102*b* of a first pair rotate about parallel axes 106*a*, 106*b* while the discs 104*a*, 104*b* of a second pair rotate about the same set of parallel axes 106*a*, 106*b*. Each of the discs 102*a*, 102*b*, 104*a*, 104*b* further comprise a plurality of intermeshing teeth 108 projecting radially from one of the parallel axes 106*a*, 106*b* and substantially orthogonal thereto. In the context used herein, "substantially" orthogonal, means that the teeth 108 are oriented at an angle of about in about five degrees (±5°) relative to the respective rotational axes 106*a*, 106*b*.

The discs 102*a*, 102*b*, 104*a*, 104*b* of each pair are spatially positioned to effect intermeshing engagement of the teeth 108, while leaving a small radial gap to enable the proper deformation or compaction forces to develop between the bound sheet material 14. In the described embodiment, the radial teeth 108 are continuous about the periphery of the discs 102*a*, 102*b*, 104*a*, 104*b*, i.e., fill the periphery, though it will be appreciated that the array of radial teeth 108 may be discontinuous so as to only occupy a segment of the periphery Similar to the axial binding mechanism 80, the teeth 108 may have any of a variety of shapes provided that the teeth 108 project radially outboard of the rotating discs 102, 104 and intermesh to deformation bind the sheet material 14

Finally, each of the pairs 102, 104 may be driven by a drive actuator 100D rotationally coupled to at least one of the discs 102*a*, 104*a* of each pair. Consequently, rotation of one of the discs 102*a*, 104*a*, drives the other disc 102*b*, 104*b* of a respective pair 102, 104 due to the intermeshing relationship of the teeth 108. In the described embodiment, the drive actuator 100D may be electronically connected to a controller 80C to regulate the speed of the drive actuator 100D or to coordinate its operation with the drive actuator 80D of the axial deformation binding mechanism 80. Alternatively, the discs 102, 104 may be coupled by a common shaft (not shown) on axis 106*a*. In this embodiment, only one actuator 100D is required.

In operation, and referring to FIGS. 2, 3 and 6 the multi-sheet stack 14SS is drawn through each of the binding mechanisms 80, 100 of the in-line deformation binding apparatus 70 along the fabrication path A. More specifically, the rotating elements 82*a*, 82*b* of the axial binding mechanism 80 deformation bind areas proximal to the leading and trailing edges 14SFL, 14SFT of the face sheets 14SF (see FIG. 2) along the first bind line BL1. The motion of the axial binding mechanism 80 feeds the multi-sheet stack 14SS along a linear feed path LP (see FIG. 1) to each of the radial binding mechanisms 100. Alternatively, driving rollers (not shown) or other drive devices may transport the multi-sheet stack 14SS to the radial binding mechanism 100. The radial binding mechanism 100 is proximal to the side edges 14SFS of the face sheets 14SF. As the discs 102, 104 are rotationally driven, the areas proximal to the side edges 14SFS of the multi-sheet stack 14SS are deformation bound. As such, second bind lines BL2 are formed, orthogonal to the first bind line BL1 to bind and seal the multi-sheet stack 14SS, thus forming a flats mailpiece 24A.

The foregoing discussion has described the fabrication of the flats mailpiece 24A along fabrication path A. Referring again to FIGS. 1-3, the mailpiece fabrication system 10 alternatively produces a standard letter size mailpiece 24B along fabrication path B. To facilitate fabrication along the second path B, the sheet material 14 passes through a pair of spatial positioning devices including the orbit nip roller 16 and a routing roller 18. While the first spatial positioning device 16 has, as its principle purpose, the function of changing the elevation of the sheet material 14 along fabrication path A, it also serves as drive roller to pass sheet material 14 to the routing roller 18. That is, since the orbit nip roller 16 is necessarily proximal to the paper source 12 for receiving sheet material 14, it may also be controlled as a standard nip roller to convey the sheet material 14 along fabrication path B.

In the described embodiment, the routing roller 18 functions to change the orientation of the sheet material 14. More specifically, the routing roller 18 changes the direction of the leading edge LE relative to the feed path FP and, additionally, the face-up or face down orientation of the sheet material 14. To change the direction of the leading edge LE, the rotational axis 18A (FIG. 2) of the routing roller 18 is oriented at an angle relative to the feed path FP of the sheet material 14. The angle formed between the feed path FP and the rotational axis 18A is forty-five degrees (45) degrees, and, accordingly, the routing roller 18 changes the direction of the sheet material 14 by a total of ninety (90) degrees.

In addition to changing the direction of the sheet material 14, and depending upon the manipulation of the fabrication assembly, it may also be desirable to cause a certain side of the sheet material 14 to remain face-up or face-down as it traverses along the fabrication path B. Such attributes of a folded or fabricated mailpiece will be predetermined depending upon the orientation of the sheet material 14 as it exits the paper source 12. The routing roller 18, therefore, performs this function in addition to changing the direction of the sheet material 14. If this feature is not required, a spatial positioning device, such as a conventional Right Angle Turn (RAT) device, can perform the singular function of changing the direction of the leading edge LE. Alternatively, conventional transport rollers may simply direct the sheet in the same direction and orientation as the original feed path FP. In this case, fabrication path B will be parallel to the feed path FP and/or to fabrication path A.

Figure 7:
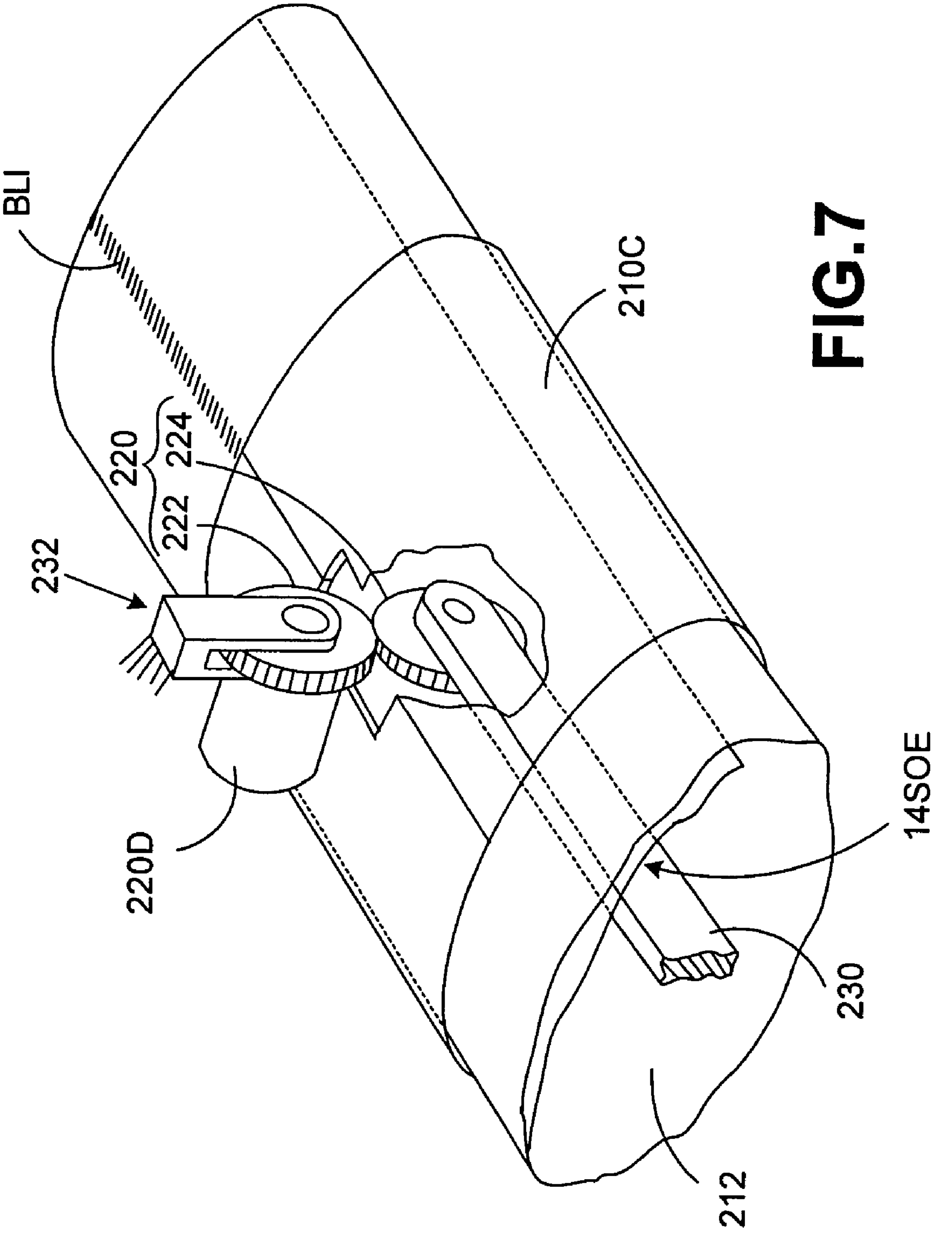
FIG. 7 is an isolated perspective view of a radial binding mechanism useful for deformation binding overlapping edges of a tubular perform to form a letter size mailpiece.

Inasmuch as a letter sized mailpiece is fabricated along fabrication path B, standard letter sized sheets may be employed throughout the fabrication process without the necessity for oversized sheets such as is required in the fabrication of a flats mailpiece. In FIGS. 2 and 7, the fabrication assembly 20B along fabrication path B also employs an in-line deformation binding apparatus 200, however, such apparatus 200 employs a curved transport baffle 210 in advance of radial and axial binding mechanisms 220 and 240. The curved transport baffle 210 rolls and overlaps the opposing edges of the sheet material 14 to form a tubular-shape preform 212. More specifically, the transport baffle 210 may include inner and outer baffle segments 210_a_, 210_b_ wherein the outer baffle segment 210_b_ includes an enlarged open end 214 for accepting sheet material 14 in a substantially planar orientation. Furthermore, the sheet material 14 is disposed between the baffle segments 210_a_, 210_b_ and caused to follow the curved contour of the baffle segments 210_a_, 210_b_. As such, the sheet material 14 is transformed from a substantially planar to a substantially elliptical or tubular shape. The transport baffle 210, therefore, rolls at least one planar sheet of material 14 to form the tubular preform 212 wherein the ends of the sheet material overlap In FIG. 7, the tubular preform 212 is introduced to a radial binding mechanism 220 similar to that previously described. In this embodiment, however, the discs 222, 224 of the radial binding mechanism 220 are adapted, i.e., rotationally supported, to bind the overlapping edges 14SOE of the tubular perform 212. More specifically, the radial binding mechanism 220 may include a central support 230 (FIG. 7) for rotationally supporting one of the rotating discs 222, while the other rotating disc 224 may be rotationally mounted to an overhead clevis support 232. The drive actuator 220D may drive either of the discs 222, 224, however, in the described embodiment, the drive motor 234 is coupled to the clevis support 222

An outer baffle support 210_c_ accepts the open end of the tubular preform 212 and guides the preform 212 to the rotating discs 222, 224. The central support 230 may be integrated with the inner baffle segment 210_b_ of the transport baffle 210 to facilitate the transition from a forming operation, i.e., rolling the planar sheet material 14 into a tubular sheet 212 to a deformation binding operation. The rotating discs 222, 224 deformation bind the tubular preform along a first bind line BL1 while, at the same time, conveying the bound tubular preform 212B along a linear feed path to the axial binding mechanism 240.

The axial binding mechanism 240 receives the preform, now deformation bound along the overlapped edges 14SEB, to deformation bind the open ends thereof along second bind lines BL2 orthogonal to the first bind line BL1. Inasmuch as the axial binding mechanism 240 is substantially similar to the mechanism described in the preceding paragraphs, the binding mechanism 240 will not be described in greater detail herein. Suffice to say that the axial binding mechanism 240 deformation binds the sheet material 14 along its leading and trailing edges 14SSL, 14SST to enclose the finished mailpiece 14.

In summary, the mailpiece fabrication system 10 of the present invention provides an apparatus to fabricate various mailpiece configurations using a common source of paper stock. Inasmuch as the system may be used in conjunction with a standard printer and/or computer (as seen in FIG. 1), the system enables various mailpiece configurations to be produced from a common or single workstation or data file. Furthermore, inasmuch as the printer is capable of varying the content material, mailpieces may be customized and/or personalized. Inasmuch as the mailpiece fabrication system employs in-line deformation binding apparatus, the speed of fabrication and system reliability are enhanced. Moreover, the use of consumable materials to fabricate mailpiece envelopes or containers are eliminated. Finally, the in-line deformation binding apparatus eliminates the requirement for specialty forms or prefabricated materials to produce a self-mailer. That is, standard paper stock may be used by the deformation binding apparatus to produce a mailpiece.

While the mailpiece fabrication system 10 has been described in the context of at least two fabrication assemblies 20A. 20B, including in-line deformation binding apparatus 70, 200, other fabrication assemblies may be employed which do not incorporate deformation binding. For example, a fabrication assembly to form a letter sized mailpiece may include an arrangement of creasing and folding rollers to (i) form an envelope using a first sheet of material and (ii) form folded content sheets using subsequent sheets of material. Such fabrication assembly is disclosed in commonly-owned and co-pending patent application entitled "METHOD AND APPARATUS FOR ENVELOPING DOCUMENTS, and is hereby incorporated by reference in its entirety. Such fabrication assembly may, alternatively, incorporate pressure sensitive sealing material disposed along the fold lines to bind and seal the envelope.

Furthermore, while the processor 30 for controlling the print commands to the paper source may be independent of the controller 40 for controlling the orbit nip rollers 16_a_, 16_b_, via the actuator, these elements 30, 40 may be connected or combined (see FIG. 1) to integrate various functions of the mailpiece fabrication system 10. That is, since the computer processor 30 inherently contains certain information, i.e., a data file (not shown) about the mailpiece to be produced, i.e., certain mailpiece attributes such as the number of pages of content material, the processor 30 can determine the most suitable mailpiece configuration based upon such attributes. For example, the computer processor 30 may determine that X number of content pages are to be printed and that a flats mailpiece is best suited to contain more than a threshold number of content sheets, i.e., when X exceeds a threshold value. In contrast, when the number of content sheets is less than the threshold number X, a letter sized mailpiece may be more suitable Consequently, the processor 30 and controller 40 can be integrated or communicate to automatically print and assemble the mailpiece in an optimum fashion, i.e., causing the sheet material to be directed along one of the fabrication paths A, B to produce the mailpiece configuration which best or optimally suits the mailpiece data to be delivered. Of course, such integration would require that the processor 30/controller 40 be in communication with, and issue control inputs/signals to, at least one of the spatial positioning devices 16, 18.

It is to be understood that the present invention is not to be considered as limited to the specific embodiments described above and shown in the accompanying drawings, which merely illustrate the best mode presently contemplated for carrying out the invention, and which is susceptible to such changes as may be obvious to one skilled in the art, but rather that the invention is intended to cover all such variations, modifications and equivalents thereof as may be deemed to be within the scope of the claims appended hereto.

What is claimed is:

1. A mailpiece fabrication system comprising:

at least one spatial positioning device adapted to receive sheet material along a feed path and to direct the sheet material along one of a first and second fabrication path, a first fabrication assembly disposed along the first fabrication path for receiving the sheet material from the at least one spatial positioning device, the first fabrication assembly producing a first mailpiece, and a second fabrication assembly disposed along the second fabrication path for receiving the sheet material from the at least one spatial positioning device, the second fabrication assembly producing a second mailpiece.

2. The mailpiece fabrication system according to claim 1 wherein the spatial positioning device is an orbit nip roller.

3. The mailpiece fabrication system according to claim 2 wherein the orbit nip roller is adapted to change the elevation of the sheet material relative to the feed path.

4. The mailpiece fabrication system according to claim 2 wherein the orbit nip roller includes idler and drive rollers each having a rotational axis, a carriage assembly having first and second end portions rotationally coupled to the respective rotational axis of the idler and drive rollers, and an actuator coupled to the carriage assembly for rotationally displacing the idler roller through an angle to change the elevation of the sheet material.

5. The mailpiece fabrication system according to claim 4 wherein the fabrication assembly includes a registration device having a compiler tray for receiving individual sheets of sheet material, wherein the orbiting nip roller is operative to stack the individual sheets onto the compiler tray, and wherein the actuator causes the idler roller to orbit through a series of angles as individual sheets are stacked.

6. The mailpiece fabrication system according to claim 2 wherein the first and second fabrication paths are parallel.

7. The mailpiece fabrication system according to claim 1 wherein the spatial positioning device includes a first and second spatial positioning devices, the first spatial positioning device adapted to change the elevation of the sheet material relative to the feed path and direct the sheet material along the first fabrication path, and the second spatial positioning device adapted to change the direction of the sheet material relative to the feed path, the second spatial positioning device operable to direct the sheet material along the second fabrication path.

8. The mailpiece fabrication system according to claim 7 wherein the second spatial position device is a routing roller for changing the direction of the sheet material such that the second fabrication path is orthogonal to the feed path.

9. The mailpiece fabrication system according to claim 8 wherein the first spatial positioning device is an orbit nip roller and wherein the second spatial positioning device is a routing roller.

10. The mailpiece fabrication system according to claim 9 wherein one of the first and second fabrication assemblies includes a registration device for receiving individual sheets of sheet material, wherein the orbiting nip roller is operative to deliver the individual sheets to the registration device for producing a flats mailpiece along the first fabrication path and is operative to deliver sheet material to the routing roller for producing a letter size mailpiece along the second fabrication path.

11. The mailpiece fabrication system according to claim 7 wherein the first spatial positioning device conveys sheet material to the second spatial positioning device when producing the second mailpiece along the second fabrication path.

12. The mailpiece fabrication system according to claim 1 wherein the mailpiece has at least one mailpiece attribute indicative of a mailpiece configuration, and further comprising a processor for determining which of the first and second fabrication paths produces the mailpiece configuration based upon the mailpiece attribute.

13. The multiple fabrication system according to claim 12 wherein the mailpiece has x number of individual sheets, and wherein the mailpiece attribute is a threshold number of sheets

14. The mailpiece fabrication system according to claim 12 wherein the processor issues a signal indicative of which the first and second fabrication path produces the mailpiece configuration, and further comprising a controller, responsive to the fabrication path signal, for controlling the operation of the spatial positioning device.

15. The mailpiece fabrication system according to claim 1 wherein the first mailpiece is a flats mailpiece and the second mailpiece is a letter size mailpiece.

* * * * *